United States Patent [19]

Elliott

[11] Patent Number: 4,974,216
[45] Date of Patent: Nov. 27, 1990

[54] ACOUSTIC ENERGY SOURCE

[75] Inventor: Myron A. Elliott, Sarasota, Fla.

[73] Assignee: The United States of America as represented by the Secretary of the Navy, Washington, D.C.

[21] Appl. No.: 131,517

[22] Filed: Apr. 5, 1971

[51] Int. Cl.$^5$ .............................................. H04R 23/00
[52] U.S. Cl. ...................................... 367/142; 181/110
[58] Field of Search ...................... 340/8, 9, 12, 13, 14, 340/7; 181/0.5 XC, 0.5 NC, 0.5 MV, 0.5 A, 110, 113; 367/142

[56] References Cited

U.S. PATENT DOCUMENTS

| | | | |
|---|---|---|---|
| 2,073,667 | 3/1937 | Williams | 340/12 R X |
| 2,081,619 | 5/1937 | Ebert | 340/14 U X |
| 2,977,573 | 3/1961 | Mott | 340/14 |
| 3,319,735 | 5/1967 | Hayes et al. | 340/8 R X |

Primary Examiner—Harold J. Tudor
Attorney, Agent, or Firm—Harvey David; John Becker; Sol Sheinbein

[57] ABSTRACT

Disclosed is a sound source which will broadcast predetermined frequency acoustical energy throughout subaqueous environmental mediums. It includes a housing body of cylindrical configuration with elongated slots located at uniform distances around the periphery thereof. A flexible, resilient sleeve surrounds said housing in such manner that it forms a movable diaphragm over each of said slots. By means of a pressure control system, internal gas pressure within said housing body may be regulated to make it less than the pressure of the subaqueous medium external thereto, thereby pulling said diaphragm inwardly through said slots. A plurality of motor driven rollers roll around the inside surface of said housing and contact the inside surface of said flexible sleeve, thereby pushing it in an outwardly direction back through said slots, so as to displace some of the subaqueous medium adjacent thereto. The movement of said diaphragms thus effects the generation of acoustical energy which is transmitted radially therefrom throughout said subaqueous medium.

14 Claims, 1 Drawing Sheet

U.S. Patent   Nov. 27, 1990   4,974,216
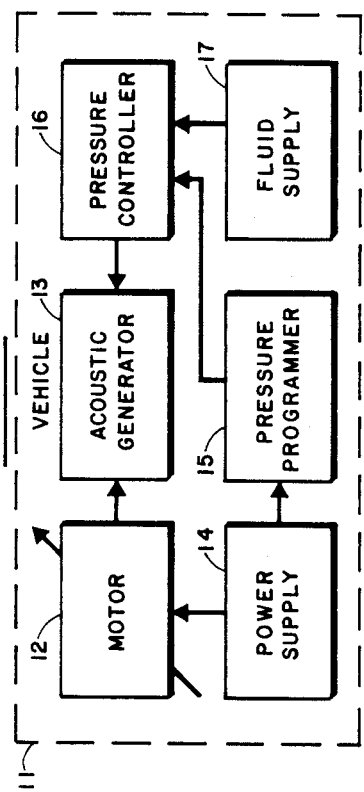
FIG. 1
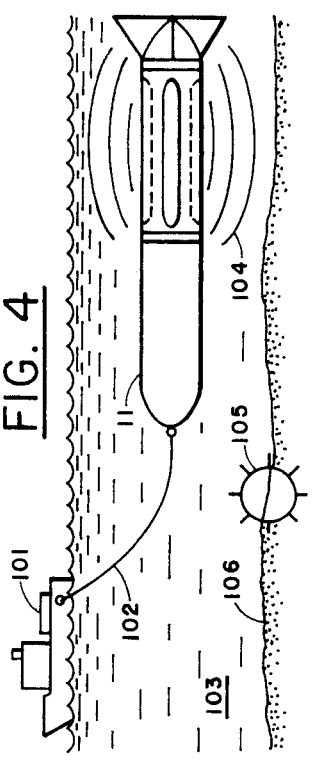
FIG. 4
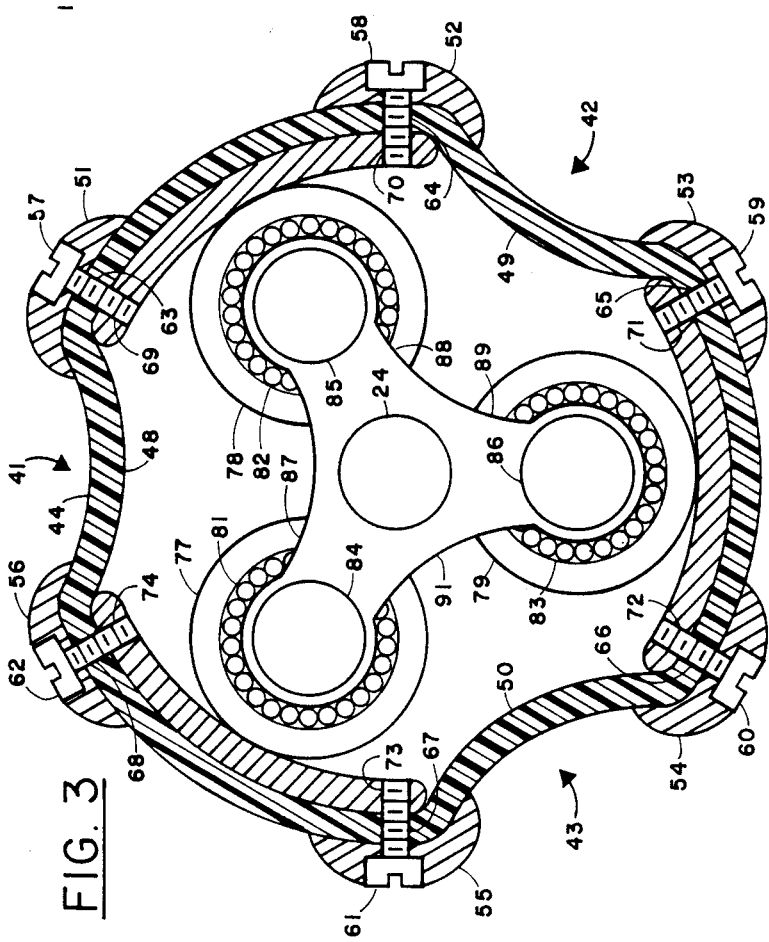
FIG. 2
FIG. 3

ACOUSTIC ENERGY SOURCE

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates generally to sound sources and in particular comprises a transducer system for broadcasting acoustical energy throughout a predetermined environmental medium in accordance with a predetermined program. In even greater particularity, the subject invention is a sonic generator for broadcasting acoustical energy throughout a subaqueous medium with controlled intensity and frequency spectrums for the detonation and/or neutralization of pressure responsive marine mines.

DESCRIPTION OF THE PRIOR ART

Heretofore, numerous types of prior art sound sources have been employed to broadcast acoustical energy throughout sea water and other suitable environmental mediums. For example, explosives, pneumatic transducers, electroacoustical transducers, mechanical pressure wave generators, electric spark sound generators, and the like, have been used for such purpose. However, although the aforementioned prior art devices are quite satisfactory for many practical purposes, for the most part, they leave a great deal to be desired, especially when it becomes necessary to generate and transmit acoustical energy at a fairly high power level and within the unusual frequency range required for passivating pressure responsive mines that are submerged in an aqueous medium or other relatively dense fluid, such as, for instance, those that are deployed by an enemy to protect his harbors, shipping lanes, and so forth, during war time.

SUMMARY OF THE INVENTION

The instant invention includes an elongated cylindrical shell or body having a plurality of elongated slots cut therein equally spaced around the circumference thereof and preferably with their longitudinal axes parallel to the o longitudinal axis thereof. A flexible elastomer sleeve is mounted around said cylindrical body and attached thereto in such manner that it covers said slots, thereby forming flexible diaphragms thereover, respectively.

Said cylindrical body is optionally filled with an appropriate gas in such manner that when the entire sonic generator is submerged within its operational medium—say, sea water—the internal gas pressure may be adjusted so that it is somewhat less than the ambient external pressure, and, hence, the aforesaid diaphragms are flexed inwardly through said slots. A plurality of rollers mounted on a suitable framework are driven around the inner wall of the cylindrical body by means of a drive shaft and suitable variable speed motor or engine, and when they come into contact with the inside surface of said flexible sleeve, it is pushed outwardly, back through said slots, by the roller action thereon.

The effectively reciprocating movement of said diaphragm portions of said sleeve, of course, moves the water or other medium ambient thereto in an outwardly direction and thereby produces pressure pulses therein. When the rotation of the drive shaft is such that it causes the rollers to roll against the inside surface of the sleeve adjacent to the body slots of a uniform rate, they are forced outwardly and pressure waves of a frequency proportional thereto are generated in said medium, which, in turn, then radiate from the entire sonic generator as acoustical energy.

Controlling the internal pressure of the cylindrical body controls the relative positions of the sleeve diaphragms and the rollers; hence, the repetition rate of broadcast of acoustical energy may be adjusted thereby—or, in fact, the turning on and off of the sonic generator may be effected thereby. The invention accomplishes such adjustment by means of a programmed piston type gas feed, which will be described more fully during the discussion of the construction and operation of the invention.

As a result of the unique concept of this invention, it overcomes many of the disadvantages of the aforementioned prior art devices, in that it facilitates the production and propagation of substantially optimum sonic energy for many practical purposes, including the purpose of passivating, detonating, neutralizing, and sweeping acoustical mines.

It is, therefore, an object of this invention to provide an improved sound source.

Another object of this invention is to provide an improved mechanical-acoustical transducer.

Still another object of this invention is to provide a sonic generator that will broadcast high power, controlled frequency acoustical energy throughout a fluid environmental medium ambient thereto.

A further object of this invention is to provide a method and means for broadcasting high power, controlled amplitude and frequency sonic energy throughout a subaqueous medium, such as fresh water, sea water, or the like.

Another object of this invention is to provide an improved method and means for exploding and sweeping infrasonic mines.

Still another object of this invention is to provide an improved method and means for neutralizing a marine mine field, so as to allow safe passage therethrough.

Still another object of this invention is to provide an improved noisemaker that may be remotely controlled.

Another object of this invention is to provide an improved method and means for repeatedly generating acoustical transients in sea water that will render pressure responsive marine mines temporarily inactive and sufficiently passive to effectively protect passing ships from being damaged thereby.

Another object of this invention is to provide a sound source that may be safely incorporated in an underwater or other seismic exploration system without detriment to sea life or other aspects of the ambient environment associated therewith.

Another object of this invention is to provide a relatively simple, compact, efficient acoustic source that may be easily and economically manufactured, operated, and maintained.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a generalized block diagram of a system incorporating the subject invention;

FIG. 2 is a schematic illustration, partially in elevation and partially in cross-section, of the acoustic source constituting the invention;

FIG. 3 is a section of the acoustic source of FIG. 2 taken at A—A thereof; and

FIG. 4 is a quasi-pictorial view depicting a typical application of the subject invention.

DESCRIPTION OF THE PREFERRED EMBODIMENT

Referring now to FIG. 1, a representative system embodiment of the invention is shown as comprising a cylindrically shaped vehicle 11 which is used to house some or all of the various and sundry components of the invention in the base thereof. Said vehicle 11 may, of course, be any type that is operable within any given environmental medium; consequently, it may be designed without limitation to make it function under water, in air, or in any predetermined fluid or other medium capable of being sonified by acoustical energy. Obviously, it would be well within the purview of one skilled in the art having the benefit of the teachings presented herewith to design and construct said vehicle for use in any suitable medium. Therefore, Without intending to limit the invention thereto, the preferred embodiment described herewith will be assumed to be that type which is to be used as an underwater vehicle. It may be self-contained or externally supported, stationary or mobile, and if the latter, may be either pushed or pulled by any appropriate tractor vehicle, as will be discussed more fully subsequently.

Disposed within vehicle 11 is a variable speed motor 12, the shaft output of which is connected to the drive shaft input of an acoustic generator 13 for the actuation thereof.

Motor 12, of course, has a power supply 14 connected thereto for the purpose of energizing it in accordance with its inherent nature. Hence, if motor 12 is an electric motor, power supply 14 will be a battery or other suitable electrical power source. On the other hand, if motor 12 is, for example, a gasoline engine or gas turbine or some other type of driving means, the power source should be compatible therewith. For convenience of disclosure, it will herein be presumed that motor 12 is an electric motor and power supply 14 is an electrical power supply.

A pressure programmer 15 is also optionally energized by power supply in this embodiment of the invention. It is connected to a pressure controller 16 which is also connected to the output of a fluid supply 17, which may, for instance, be compressed air or any other suitable pressurized gas. The output of pressure controller 16 is connected to the aforesaid acoustic generator 13, so as to supply regulated pressurized fluid to the inner chamber thereof for purposes which will be discussed more fully subsequently.

As shown in the system of FIG. 1, the entire invention is incorporated within a carrier vehicle 11; however, it is not intended that the invention be limited thereto, since it would be well within the purview of the artisan having the benefit of the teachings presented herewith to, say, house acoustic generator 13 and motor 12 in carrier vehicle 11 and place the other components at some other remote place, such as, for instance, in some suitable tractor vehicle which may be used to tow or push the invention through its environmental medium.

FIG. 2 disclosed the invention as being in two sections, the left section of which is a schematic partially cross-sectioned view of the motor and pressure controller elements, and the right section of which is an elevational schematic pictorial view of the sound head components. In so far as possible, the elements of FIG. 2 will be referenced by the same numerals used to reference like elements in FIG. 1 and the other figures of the drawing, as well, although each thereof may not appear in all figures of the drawing.

Vehicle 11 in this particular embodiment has an elongated body which may have stabilizing and/or control fins 22 mounted on the rear (right) end thereof for guidance purposes. On the front (left) end thereof is a nose section 23 which is preferably pointed or rounded in such fashion as will facilitate moving vehicle 11 through its underwater or other environment. Obviously, the shape of body 21, including both the front and rear thereof, should be such as will make the entire invention function in as expeditious a manner as possible, regardless of its ambient environment.

Disposed in the front section of body 21 is motor 12 having a drive shaft 24 connected thereto which extends through a front wall 25, through a pipe 26, and a rear wall 27. Said pipe 26, as may readily be seen, extends between walls 25 and 27 and is connected thereto in any convenient conventional manner, as by welding or the like, so as to act as a rigid support spacer therefor. A plurality of holes or passages 28 and 29 are located in walls 25 and 27, respectively, so that gas or some other fluid may be easily forced therethrough. The outside surface of the aforesaid pipe 26 also acts as a bearing sleeve for a substantially free iron piston-type armature 31 which is slidably mounted thereon in such manner that it may be magnetically driven along the longitudinal axis thereof. A pair of electrically solenoids 32 and 33, each of which are configured as ring field coils, are respectively mounted adjacent the ends of armature 31, and they are capable of being energized by the above-mentioned power supply 14, preferably but not necessarily in conjunction with the aforementioned programmer 15. They, of course, drive piston armature 31 in a reciprocating motion as a result of alternate pulses of current being supplied thereto. Said reciprocating motion is restricted by a pair of coil centering springs 34 and 35 which are mounted around pipe 26 and disposed between the ends of armature 31 and walls 25 and 27, respectively. Piston armature 31 will then have a natural period of resonance that is proportional to its mass, the spring constant of centering springs 34 and 35, and the compliance of the gas trapped at both ends thereof. Although said natural resonance frequency may be adjusted over a wide range of values, for most practical purposes, it would probably be in the range of 5 to 10 Hz in most embodiments of the invention.

Disposed between field coils 32 and 33 is a ring-like spacer 36, with the inside diameter thereof slightly larger than the outside diameter of piston armature 31. Hence, if and when the end chambers 37 and 38 are filled with a gas 39 or other fluid, there will be enough leakage of gas between piston armature 31 and spacer 36 to keep the average pressure substantially the same at each end thereof.

Although not specifically shown in FIG. 2, for the sake of simplicity of disclosure, all of the components depicted in FIG. 1 may be located in the nose section of vehicle 11, along with motor 12, and, of course, their interconnections and interaction are comparable thereto.

The rear sound head section of vehicle 11 is predominantly occupied by the various and sundry components making up the aforesaid acoustic generator 13 and the gas supplied thereto by the reciprocating piston type movement of armature 31. It will now be discussed with reference to both FIGS. 2 and 3.

As previously indicated, FIG. 3 is a section taken at A—A of FIG. 2, and it shows the mechanism which, in fact, generates and broadcasts acoustical energy by timely effecting pressurization and rarefication of the water or other environmental medium ambient thereto. Again, for the sake of simplicity of disclosure, the cross-section of the device of FIG. 3 is portrayed schematically, since it would be obvious for the artisan having the benefit of the teachings presented herewith to design and engineer the invention to the useful state. FIGS. 2 and 3 will now be discussed together.

The cylindrical body 21 of vehicle 11 has a plurality of elongated slots 41, 42, and 43 located therein, and completely around said body is disposed an elongated flexible elastomer sleeve 44 in such manner that it covers said body and the slots therein. As best shown in FIG. 2, a pair of clamps 45 and 46 are employed to hold sleeve 44 in place. Clamps 45 and 46 may themselves be tightened and held in place by any conventional means, such as by pluralities of bolts 47 and 48, or the like. Of course, as may readily be seen, said clamps 45 and 46 are placed at the ends of sleeve 44, respectively, so as to cause it to effect flexible resilient diaphragms 48, 49, and 50 that cover all of said slots 41, 42, and 43, respectively.

In order to secure sleeve 44 to body 21 adjacent to slots 41, 42, and 43, a plurality of bars 51 through 56 are mounted thereon and are securely attached to said body 21 by means of rows of threaded bolts 57 through 62 which extend through appropriately located rows of holes 63 through 68 in sleeve 44 and which are screwed into rows of compatibly threaded holes 69 through 74 in body 21.

As previously mentioned, the body section of vehicle 11 which constitutes sound head 13 is preferably cylindrical in shape. Therefore, it has a uniform round inside ring-like annulus in that area. Disposed within said inside diameter of sound head 13, is a plurality of rollers 77, 78, and 79, which by means of suitable roller or other bearings 81, 82, and 83, are respectively connected for rotation on spindle shafts 84, 85, and 86, which, in turn, are respectively attached to a trio of arms 87, 88, and 89 of a cage 91. Cage 91 is, of course, attached to the aforesaid drive shaft 24, so that it may be rotated therewith when motor 12 is energized.

In order to provide dynamic stability—and, thus, reduce vibration—rollers 77, 78, and 79 are preferably to be designed that they roll against the inside annulus surface of body 21; however, it should be obvious that they could be functional at some lesser efficiency if they did not so do. Furthermore, it should be understood that the materials selected for such rollers may be any that would provide smooth operation and long life, as they roll against the inside surfaces of body 21 and resilient sleeve 44. Hence, said rollers may, for instance, be made of metal, rubber, plastic, or the like, and, therefore, they may be hard surfaced or more or less resiliently surfaced, as desired, in order to effect firm or cushioned impacts with the diaphragm portions of sleeve 44 as they roll thereagainst.

At this time, it might be well to mention that although the preferred embodiment disclosed herein is constructed with trios of slots, diaphragms, rollers, etc., any number thereof may be used that would optimize the subject invention for any given operational purpose. Hence, they may be designed, for example, to have one or one hundred thereof, in the event circumstances so warrant. Obviously, it would be well within the purview of one skilled in the art having the benefit of the teachings presented herewith to make the design choices necessary to effect whatever structural configuration is necessary or desirable at any given time.

Referring now to FIG. 4, there is shown a typical situation in which the instant invention may be used to an advantage. A tractor vehicle, such as a ship 101 in this case, is employed to tow by means of a cable 102 an underwater version of vehicle 11 containing the inventive structural combination illustrated in FIGS. 1 through 3. Said vehicle is, of course, being towed through sea water 103, so that acoustical energy 104 generated by the aforementioned sound head 13 will radiate therethrough and detonate a pressure responsive marine mine 105 laying on or buried in sea floor 106, as will be mentioned again in greater detail during the discussion of the operation of the invention presented below.

MODE OF OPERATION

The operation of the invention will now be discussed briefly in conjunction with all of the figures of the drawing.

When motor 12 is turned on, it causes drive shaft 24 to be rotated at whatever number of revolutions per minute it is set for. Shaft 12, in turn, rotates cage 91, thereby causing rollers 77, 78, and 79, to roll around the inside surface of housing 21. When said rollers cc into contact with the inside surface—that is, the diaphragm portions—of flexible sleeve 44, the portions thereof that may be extending through slots 41, 42, and 43 at that time are forced outwardly, thereby causing them to push against their ambient environmental medium—in this case, herewith (without limitation) defined as sea water for simplicity of disclosure purposes. Now, as may readily be seen, diaphragm portions 48, 49, and 50 of sleeve 44 need not—and, as a matter of fact, probably will not—extend through their respective slots, unless the internal gas pressure of the sound head is regulated to be less than the external pressure of the water. Hence, under such conditions, no outward movement thereof will be effected by the rollers because there may be no physical contacted therebetween. Therefore, during the broadcast of acoustical energy, the internal pressure of body 21 should be such as would cause sleeve 44 to be forced inwardly through the slots at those times when they are not being moved outwardly by the rollers, as they are driven around the annulus.

From the foregoing, it may readily be appreciated that proper adjustment of motor speed and internal gas pressure will cause the invention to produce its peak acoustic output. On the other hand, said output may be decreased or cut off by either reducing the motor speed or increasing the internal gas pressure, or both. In the latter instance, of course, the flexible diaphragms are pushed out through the slots by the gas to the extent that the contact thereof by the rollers is prevented.

Thus, it may also be seen that pulsing the acoustic output of the invention is simply a matter of pulsing the gas pressure within the housing, so that the diaphragms can alternately or not be contacted by the rollers.

There are many ways in which the internal gas pressure may be pulsed; however, it has been found that the most direct way is by means of the arrangement shown in the front section of FIG. 2. Piston armature 31 is driven as a result of alternating pulses of current being supplied to solenoids 32 and 33. Its motion is reciprocating against springs 34 and 35, as it slides along the outer bearing surface of sleeve-like pipe 26, and the stroke length thereof can be controlled by the amplitude of the current in the solenoids, which, of course, is regulated by the aforementioned programmer 15 and controller 16.

As previously suggested, the piston will have a natural resonance frequency based on its mass, the spring constant of the centering springs, and the compliance of the gas trapped at either end thereof. There will be enough leakage of gas around the piston to keep the average pressure about the same at each end. By suitable adjustment of said average internal pressure and solenoid current, various degrees of modulation of the acoustic output can be achieved, including the steady state, as well as the pulsed outputs having amplitudes that vary from low to peak values, because the gas can travel through holes 28 and 29 of walls 25 and 27 and into the right hand—that is, the sound head section—of body 21.

One of the primary advantages of the method and means constituting this invention is that they will permit smaller and more explosion resistant acoustic sweep systems to be built for neutralizing, detonating, and sweeping infrasonic mines. Consider, for example, an infrasonic mine that normally requires an underwater acoustic signal of 9 Hz to fire it. By use of this invention it may be detonated by a primary signal of 90 Hz that is pulsed at 9 times per second, and using such higher primary frequency results in a substantial saving in size of the device required for the sweep. Theoretical evidence of this is presented as follows:

The sound pressure level (P) of the acoustic output of low frequency sound sinusoidal sources is proporational to the product of the volume $\Delta V$ (peak to peak) swept out per cycle by the acoustic radiators and the square of the frequency (f) being generated. Thus, for instance, at a given range from the sound source:

$$P = K f^2 \Delta V,$$

where K is a proportionally constant. If frequency f is increased by a factor of 10, then water volume $\Delta V$ can be reduced by a factor of 100 and the same level of sound pressure output will be produced. As a matter of fact, moreover, the output of the sweep might even be increased by a factor of 10 (corresponding to an increase in output of 20 db) for the 90 Hz, as compared to 9 Hz, and still allow a reduction of 10 fold in $\Delta V$.

The pulse rate, of course, is not limited to any given frequency, since the piston can be tuned to oscillate at any desired frequency (4 or 5 Hz for instance) without necessitating any change in the overall size of the sweep. This could, for example, permit the subject device to sweep a 4 Hz seismic frequency mine.

Another advantage over presently used minesweeping methods is that the acoustic output of this device can be changed or modulated over its full range, without changing either the pulse frequency or the primary acoustic output frequency. Thus, its output signal may be customized by appropriate programming and control to be far more effective against most pressure responsive marine mines, as well as for other purposes.

The operational procedure depicted in FIG. 4 is typical of that used in sweeping marine mines with the subject invention. As vehicle 11 is towed by ship 101, it broadcasts sonic energy throughout water 103. When mine 105 is impacted by said sonic energy 104 that has been properly programmed, it causes mine 105 to explode harmlessly, thereby preventing its being exploded by a ship or other marine vehicle to their detriment.

Of course, as previously implied and indicated, the subject sound source may be used wherever sound sources are needed; therefore, in addition to being used to passivate marine mines, it may be used as the sound source for numerous types of seismic exploration, without harming the ambient environment.

Furthermore, although vehicle 11 may be moved and guided by a suitable tractor vehicle as it is in FIG. 4, it may be self-propelled, self-guided, piloted by a human, or remotely controlled by any appropriate telemetering system—such as, for example, by radio, sonar, or the like.

From the foregoing, it may readily be seen that the subject invention constitutes a vast improvement over the prior art for many practical purposes and, hence, it is of considerable significance as a scientific instrument.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. An acoustic energy source, comprising in combination:
    housing means having a circular bore therethrough and slot means located in and extending through the wall thereof;
    resilient means mounted around said housing means in such manner as to partially extend inwardly through the slot means located therein;
    means disposed for rotation within the bore of said housing means for intermittently contacting and moving that portion of said resilient means that extends inwardly through the slot means in said housing means in an outwardly direction during the rotation thereof;
    an adjustable speed motor connected to said resilient means contacting and moving means for effecting the rotation thereof at a predetermined speed; and
    means effectively connected to said adjustable speed motor for the timely energization thereof.

2. The invention of claim 1, further characterized by means for moving said housing means along a predetermined course within water.

3. The device of claim 1, wherein said slot means located in and extending through the wall of said housing means comprises at least one hole.

4. The device of claim 1, wherein said slot means located in and extending through the wall of said housing means comprises a plurality of elongated holes distributed in a predetermined manner around the periphery of said housing means.

5. The device of claim 1, wherein said slot means located in and extending through the wall of said housing means comprises a plurality of holes having predetermined respective geometrical configurations uniformly distributed around the periphery of said housing means.

6. The device of claim 1, wherein said resilient means mounted around said housing means in such manner as to partially extend inwardly through said slot means comprises a flexible elastomer sleeve.

7. The device of claim 1, wherein said means disposed for rotation within the bore of said housing means for intermittently contacting and moving that portion of said resilient means that extends inwardly through said slot means in an outwardly direction during the rotation thereof comprises:
- a drive shaft;
- a cage, having a plurality of radially extending arms, connected to said drive shaft;
- a plurality of spindle shafts respectively connected to the outer extremities of the plurality of radial arms of said cage; and
- a plurality of rollers mounted for free rotation on said plurality of spindle shafts, respectively.

8. The invention of claim 7, further characterized by a plurality of bearings respectively connected between said spindle shafts and said rollers for facilitating the rotation thereof.

9. The device of claim 1, wherein said housing means having a circular bore therethrough comprises a closed-ended vehicle body adapted for being moved through a predetermined environmental medium.

10. The device of claim 9, wherein said predetermined environmental medium is water.

11. The invention of claim 1, further characterized by a gas of predetermined pressure disposed within the bore of said housing means.

12. The invention of claim 11, further characterized by means effectively connected to said housing means for varying the pressure of said gas in a predetermined manner.

13. The invention of claim 12, wherein said means effectively connected to said housing means for varying the pressure of said gas in a predetermined manner comprises:
- a pair of walls located in said housing means;
- a plurality of holes respectively located in said pair of walls;
- a spacer pipe connected between said pair of walls;
- a freely slidable armature mounted for reciprocating motion on said spacer pipe;
- a pair of electrically energizable field coil solenoids mounted within said housing means and disposed adjacent to the opposite ends of said armature, respectively; and
- a pair of centering springs connected between said pair of walls and the ends of said armature adjacent thereto, respectively.

14. The invention of claim 13, further characterized by a ring spacer disposed between said field coil solenoids and around said freely slidable armature in such manner that the aforesaid gas may flow between the inside diameter of said ring spacer and the outside diameter of said freely slidable armature at a predetermined rate.

* * * * *